(12) United States Patent
Garrett

(10) Patent No.: US 12,325,513 B1
(45) Date of Patent: Jun. 10, 2025

(54) NOTCHED HYDROPLANE SURFACE FOR AIRCRAFT FLOATS

(71) Applicant: Daniel W. Garrett, Woodbury, MN (US)

(72) Inventor: Daniel W. Garrett, Woodbury, MN (US)

( * ) Notice: Subject to any disclaimer, the term of this patent is extended or adjusted under 35 U.S.C. 154(b) by 0 days.

(21) Appl. No.: 18/778,580

(22) Filed: Jul. 19, 2024

(51) Int. Cl.
  *B64C 25/54* (2006.01)
  *B64C 25/20* (2006.01)
  *B64C 35/00* (2006.01)

(52) U.S. Cl.
  CPC .............. *B64C 25/54* (2013.01); *B64C 25/20* (2013.01); *B64C 35/008* (2013.01)

(58) Field of Classification Search
  CPC ................ B64C 25/54; B64C 6635/00; B64C 6635/008
  See application file for complete search history.

(56) References Cited

U.S. PATENT DOCUMENTS

| | | |
|---|---|---|
| 2,661,917 A | 12/1953 | O'Connor et al. |
| 2,770,832 A | 11/1956 | Martin |
| 5,165,141 A | 11/1992 | Soltani |
| 10,350,441 B2 | 7/2019 | Cordani et al. |
| 11,123,587 B2 | 9/2021 | Schnarr et al. |
| 2013/0075538 A1 | 3/2013 | Wiplinger |
| 2017/0080267 A1 | 3/2017 | Wagner et al. |
| 2019/0168873 A1 | 6/2019 | Wiplinger |
| 2024/0132213 A1 | 4/2024 | Wiplinger |
| 2024/0140597 A1 | 5/2024 | Pasic et al. |

OTHER PUBLICATIONS

Currey; Aircraft Landing Gear Design: Principles and Practices; published by American Institute of Aeronautics and Astronautics, Inc. Washington, D.C.; 4 pages; published Jan. 1, 1988.
Air-Tractor-1; AT-802F Initial Attack Firefighter; Air-Tractor_802F-Brochure_2022.pdf; downloaded and view Jul. 2, 2024; Air Tractor, Inc.; Olney, TX; 11 pages; published 2022.
Floatplane; Wikipedia; Wikimedia Foundation, Inc.; https://en.wikipedia.org/wiki/Floatplane; 3 pages; earliest creation or revision date 2017.
Mainuddin; Preliminary Design of Aircraft Landing Gear Strut; IJIRT, vol. 4, Issue 12; 6 pages; dated May 2018.

(Continued)

*Primary Examiner* — Nicholas McFall
(74) *Attorney, Agent, or Firm* — bobharter.com; Robert J. Harter

(57) ABSTRACT

An amphibious aircraft includes two floats, each having a front hull and an elevated rear hull with a step between the two. Each float also has a retractable main landing gear with a main wheel. The step and the main wheel are placed strategically close to each other to provide readily controllable landings and takeoffs from water or land. To achieve such close placement of the step and the main wheel, a clearance notch in the front hull, near the step, provides space into which part of the main landing gear can extend when the main wheel descends to a deployed landing position. The size of the notch is sufficiently small to have an inconsequential effect on the front hull's ability to hydroplane. In some examples, a colored portion of the main landing gear protrudes above the float to provide a visual indication of when the main wheel is retracted.

18 Claims, 14 Drawing Sheets

(56) References Cited

OTHER PUBLICATIONS

Avstop; Chapter 4—Seaplane Operations—Preflight and Takeoffs; Aviation Online Magazine; http://avstop.com/ac/sea_plane/4-4.html; 2 pages; downloaded and viewed on Jul. 2, 2024; site indexed by Google prior to Jul. 2014.
Air-Tractor-2; AT-802F Initial Attack Firefighter; video published via youtube.com; https://www.youtube.com/watch?v=wb4RljqeE-A; 3 screenshots, 2 pages, dated 2012.
Cub Crafters; Cub Crafters NX Cub; Cub Crafters, Inc.of Yakima, WA; https://cubcrafters.com/xcub; 1 page; viewable via the Internet on Dec. 3, 2022.
EDO; EDO 4930 Amphibian Floats; dhc-2.com; https://dhc-2.com/C-FZKV_FOR%20SALE_2018.html; 1 page, viewable via the Internet on Aug. 16, 2018.
Aerocet; Destinations Unlimited; Aerocet Inc. of Priest River, ID; https://aerocet.com/; 3 pages; viewable via the Internet Nov. 2021.
Wipaire; Wipline Floats; Wipaire Inc. of South Saint Paul, MN; https://www.wipaire.com/wipline-floats/; 1 page; published 2016.

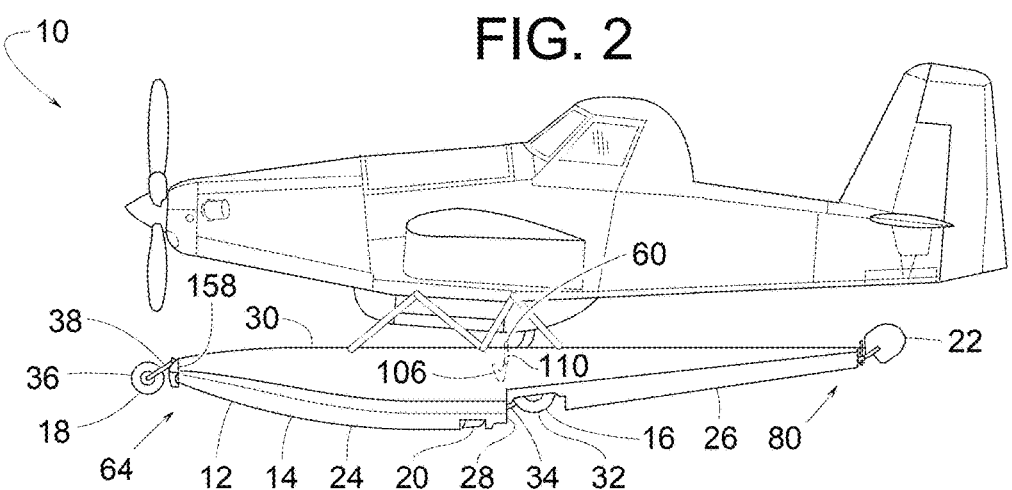
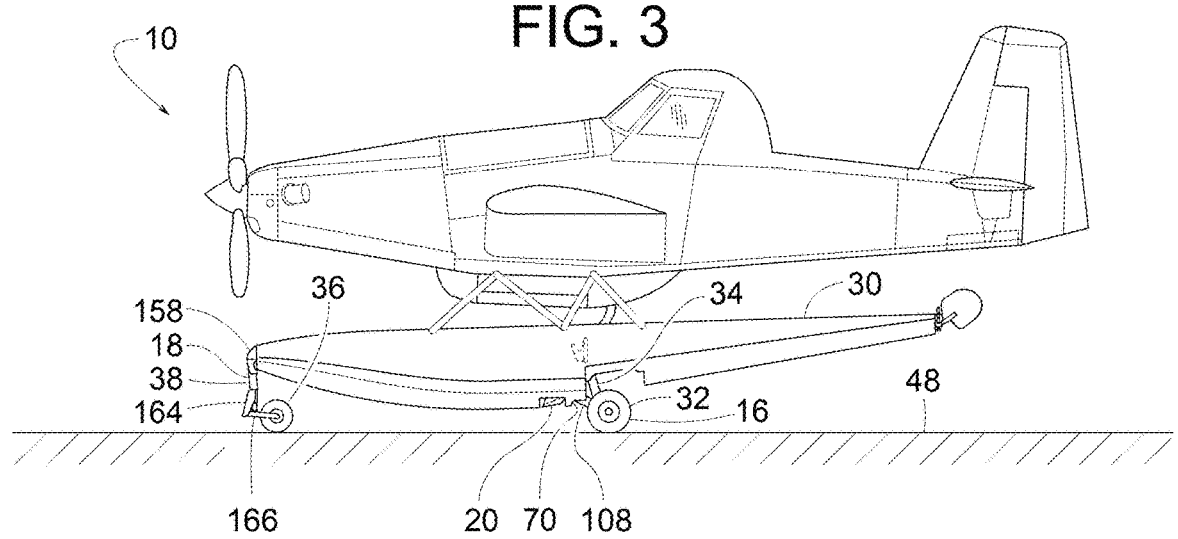
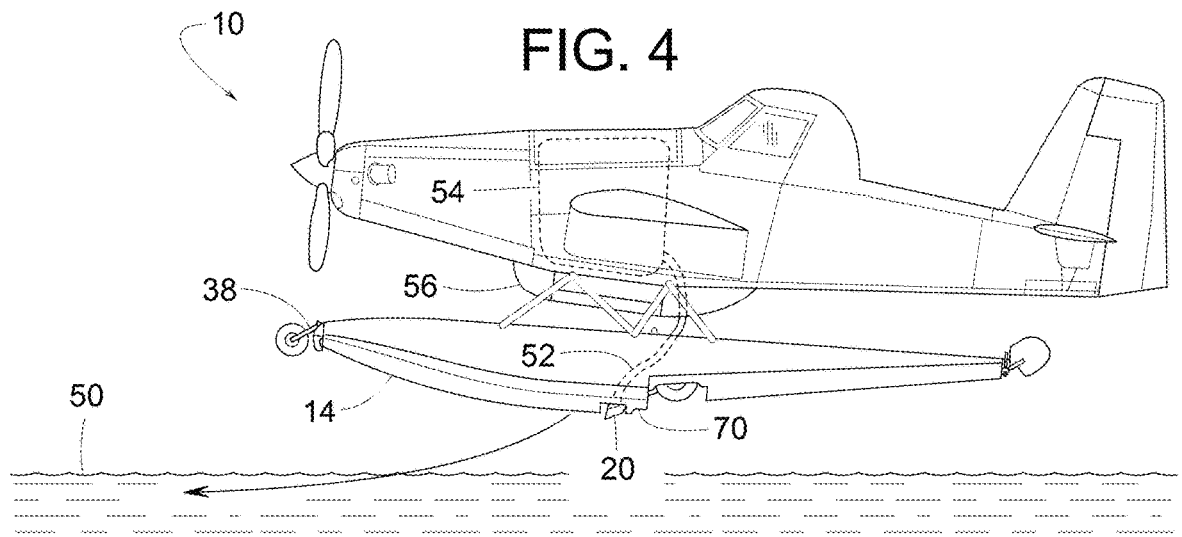

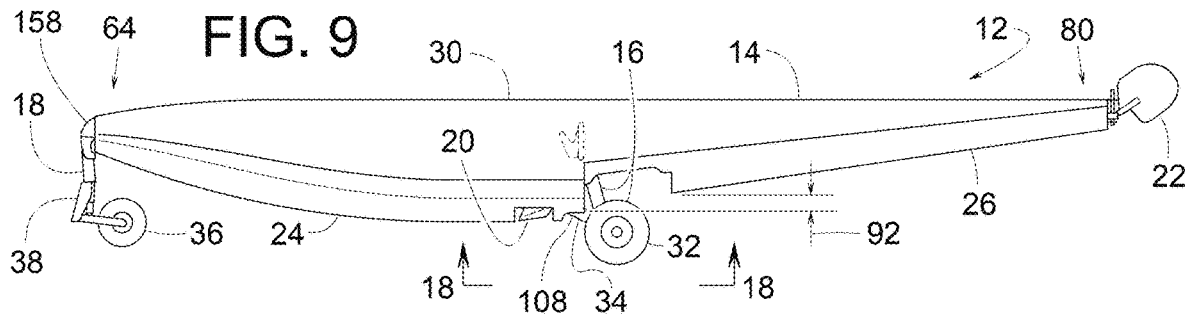
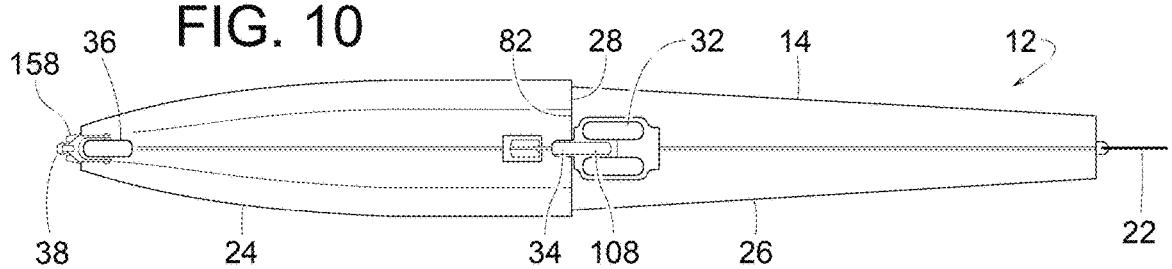
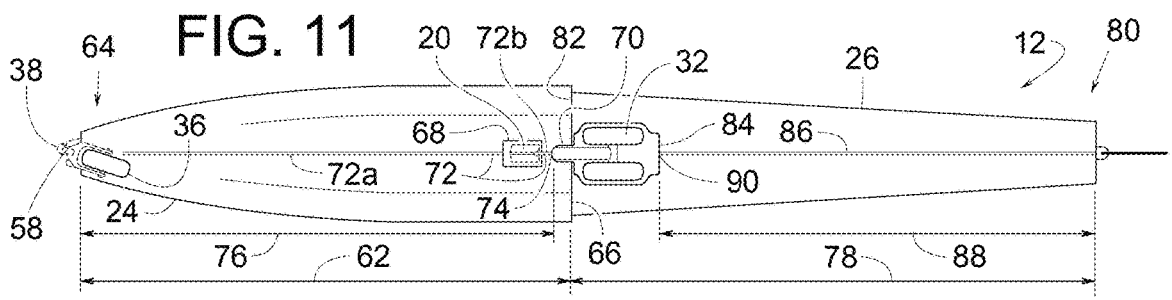
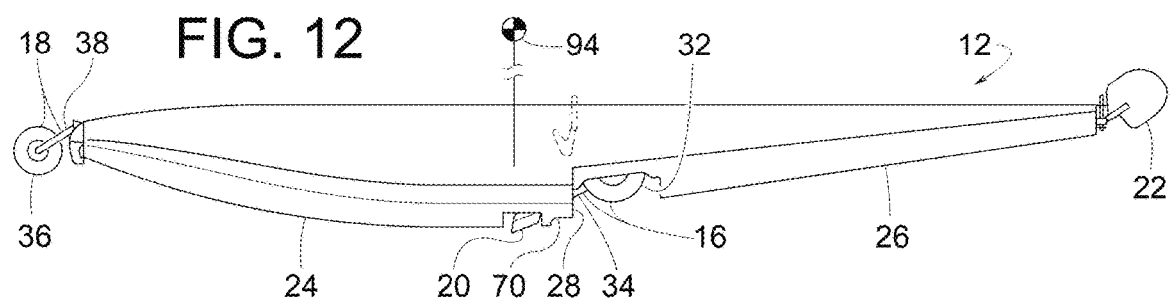
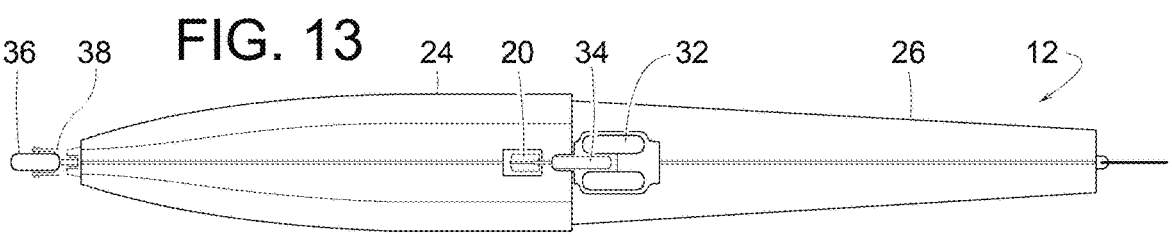

FIG. 19
FIG. 20
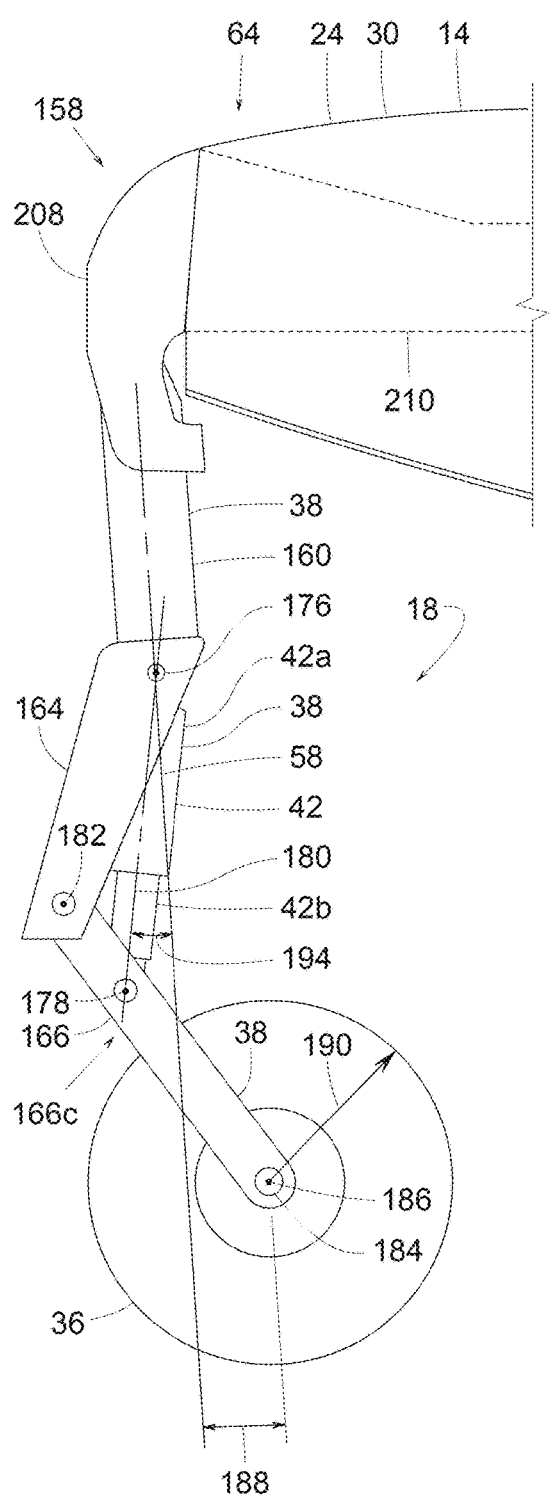
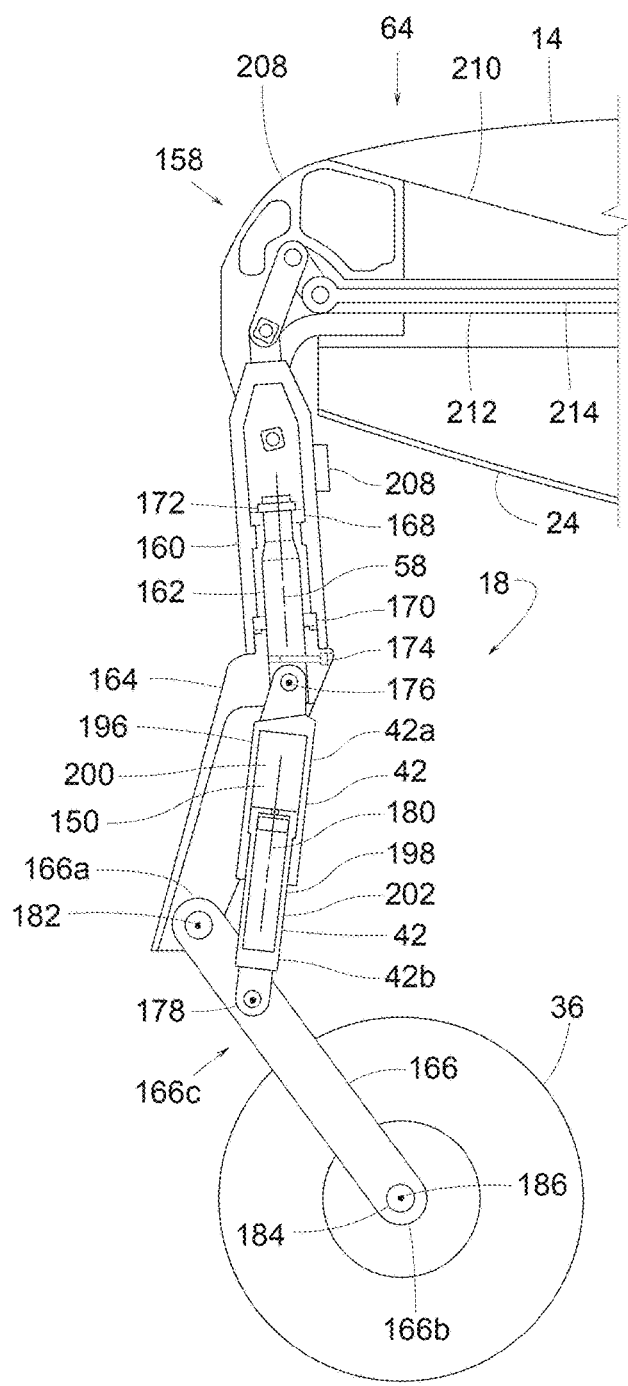

FIG. 24
FIG. 25
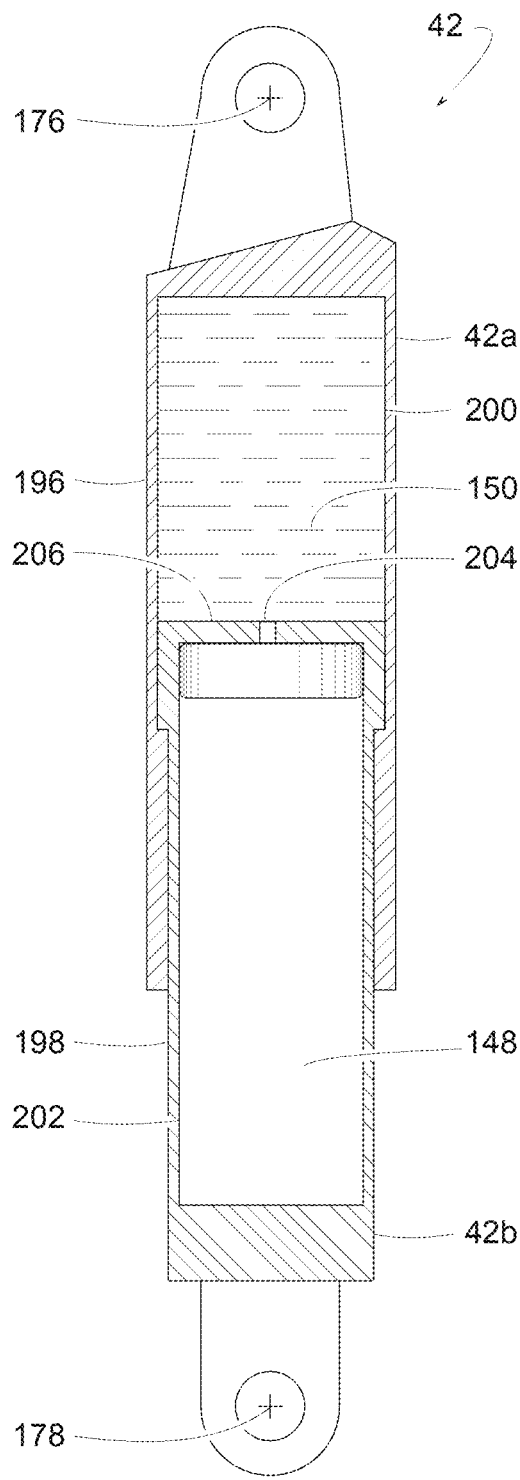
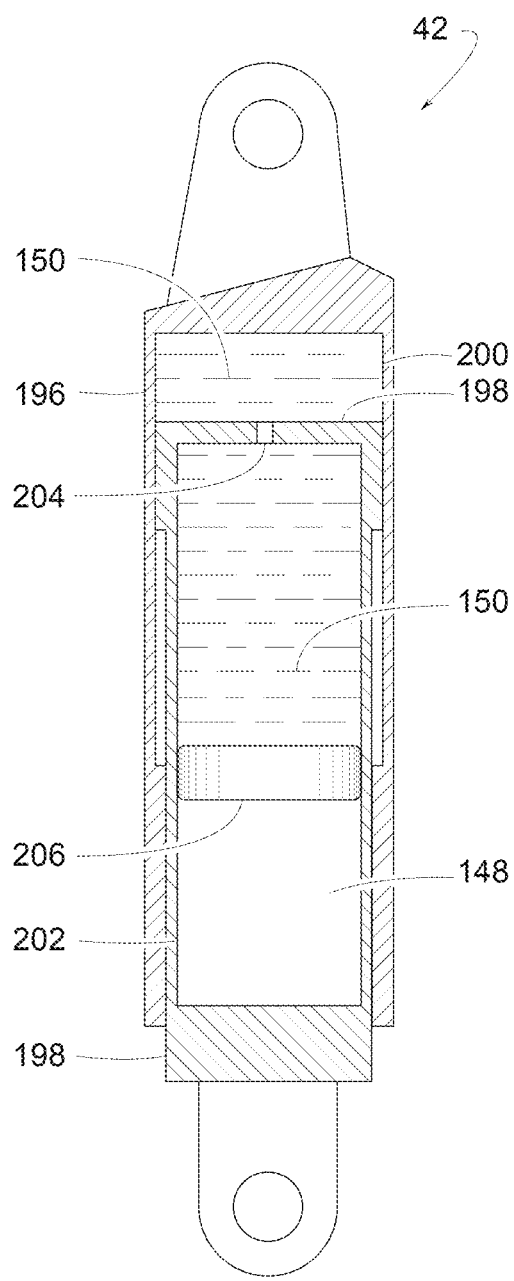

NOTCHED HYDROPLANE SURFACE FOR AIRCRAFT FLOATS

FIELD OF THE DISCLOSURE

This patent generally pertains to amphibious aircraft with floats and more specifically to the location of the aircraft's main landing gear with respect to the float's hull step.

BACKGROUND

Amphibious aircraft often include a pair of floats with wheeled landing gear. The floats enable the aircraft to land or take off from water, while the landing gear is for operating on land. The landing gear usually includes a nose gear or wheel at the front of each float, and main landing gear near the center of the float.

The hull or bottom portion of the float might have a hull step between the front and rear portions of the hull such that the rear portion is higher than the front. During takeoff from water, the lower front portion of the hull provides an ideal surface for hydroplaning, while the elevated rear portion provides vertical clearance that allows the nose of the aircraft to tilt up for takeoff.

One prominent application of amphibious aircraft with floats is in firefighting. These aircraft are fitted with specialized firefighting systems that allow them to scoop water from bodies of water using their floats. The water is then stored in tanks within the aircraft and later released onto wildfires to help suppress and control the spread of flames. This capability is particularly valuable in remote or inaccessible areas where traditional firefighting equipment may face logistical challenges. Amphibious aircraft with floats, such as the Air Tractor AT-802F (Fire Boss), are highly regarded for their rapid response capabilities in firefighting efforts worldwide, highlighting their crucial role in disaster response and forest fire management.

BRIEF DESCRIPTION OF THE DRAWINGS

FIG. 2 is a side view of the aircraft shown in FIG. 1.

FIG. 3 is a side view similar to FIG. 2 but with the aircraft on land.

FIG. 4 is a side view similar to FIG. 2 but showing the aircraft about to scoop up water.

FIG. 9 is a side view of an example float assembly for the amphibious aircraft shown in FIG. 1, wherein the nose wheel is in the landing position, and the main wheel is in the deployed position.

FIG. 10 is a bottom view of FIG. 9.

FIG. 11 is a bottom view similar to FIG. 10 but showing the nose wheel turned left.

FIG. 12 is a side view similar to FIG. 9 but with the nose wheel in the stored position and the main wheel in the retracted position.

FIG. 13 is a bottom view of FIG. 12.

FIG. 19 is a side view of an nose gear for the amphibious aircraft shown in FIG. 1, wherein some of the parts are shown schematically for clarity FIG. 20 is a cross-sectional side view of FIG. 19, wherein some of the parts are shown schematically for clarity.

FIG. 24 is a cross-sectional view of an example bifluidic strut for the nose gear shown in FIGS. 19-22, wherein the strut is shown in an extended state.

FIG. 25 is a cross-sectional view similar to FIG. 24 but showing the strut in a compressed state.

DETAILED DESCRIPTION

Figure 1:
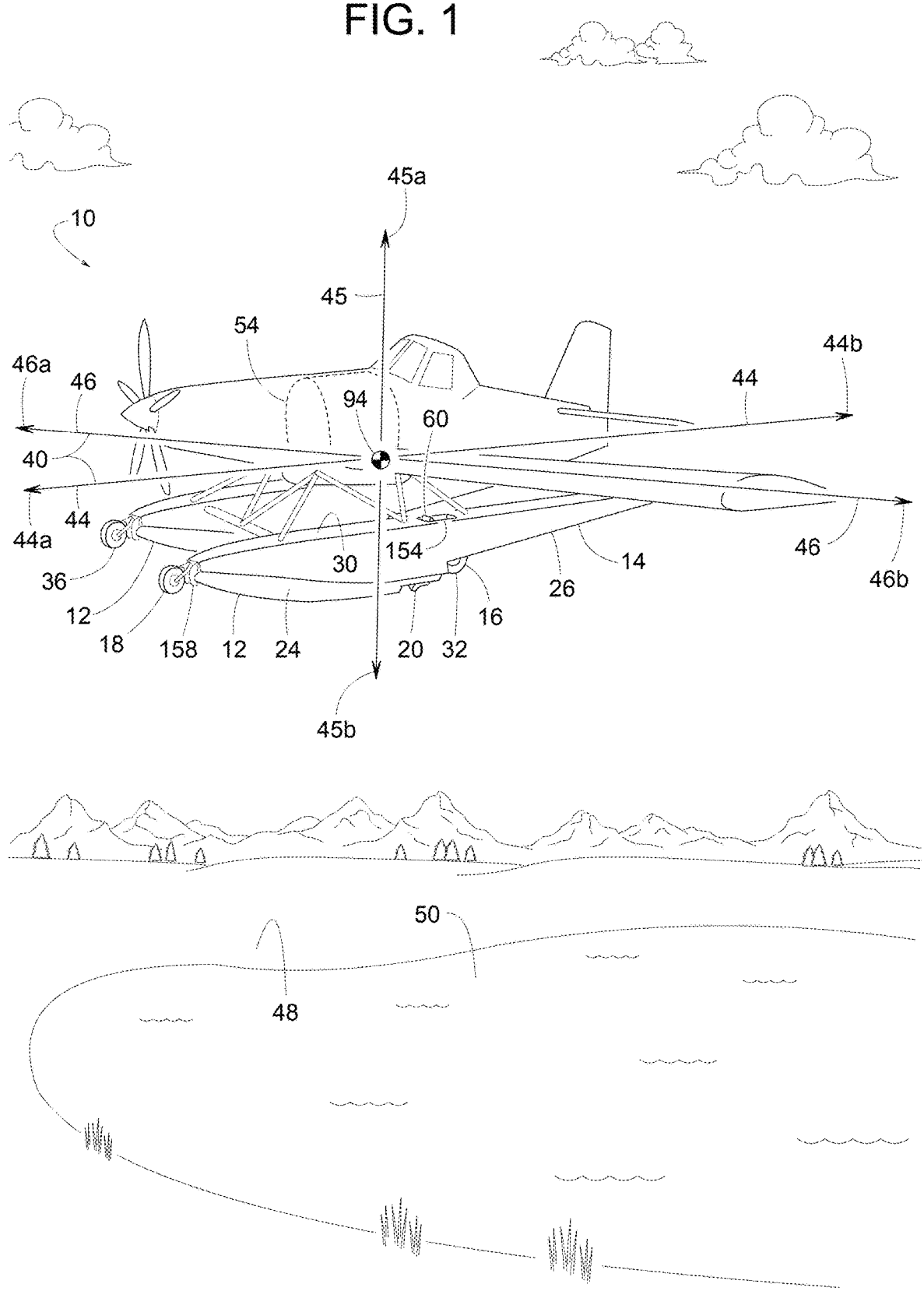
FIG. 1 is a perspective view of an example amphibious aircraft constructed in accordance with the teachings disclosed herein.

FIGS. 1-27 illustrate various examples and features of an amphibious aircraft 10 with at least one float assembly 12. In some examples, the aircraft 10 is an airplane (fixed wing aircraft). Some examples of the float assembly 12 comprise a float 14, a main landing gear 16, a nose gear 18, a water scoop 20 and a rudder 22. In some examples, the float 14 includes a front hull 24, a slightly elevated rear hull 26, a step 28 between the two hulls 24 and 26, and a deck 30 at the top. The main landing gear 16 includes a main wheel 32 and a main linkage 34 that couples the main wheel 32 to the float 14. The nose gear 18 includes a nose wheel 36 and a nose linkage 38 that couple the nose wheel 36 to the float 14.

The main linkage 34 moves the main wheel 32 between a retracted position (FIGS. 1, 2, 4-8 and 12-15) and a deployed position (FIGS. 3, 9-11 and 16-18) relative to the float 14. The nose linkage 38 moves the nose wheel 36 between a stowed position (FIGS. 1, 2, 4-8, 12 and 23) and a landing position (FIGS. 3, 9-11 and 19-22) relative to the float 14.

The main linkage 34 provides the main wheel 32 with fluid-dampened suspension, so the main wheel 32 in the deployed position is further moveable in response to the weight or load applied to the main wheel 32. Likewise, the nose linkage 38 provides the nose wheel 36 with fluid-dampened suspension, so the nose wheel 36 in the landing position is also moveable in response to the weight or load applied to the nose wheel 36.

FIG. 1 shows a spatial frame of reference 40 of the aircraft 10. FIGS. 2-8 illustrate some of the aircraft's operating modes. FIGS. 9-13 show the aircraft's float assembly 12 in various configurations. FIGS. 14-18 show various views of the main landing gear 16. FIGS. 19-23 show different views of the nose gear 18. FIGS. 23 and 24 show an example bifluidic strut 42 that can be used in the nose linkage 38.

Referring to FIG. 1, the aircraft 10 is shown flying level. The term, "flying level" means that the aircraft 10 is traveling horizontally in a steady, upright (not inverted), linear flight path at a constant elevation, not banking or rolling, not turning (yaw), not pitching, etc. The term, "flying level," provides a frame of reference 40 to words of orientation or direction, such as up, down, above, below, forward, rearward, front, back, higher, lower, etc.

The spatial frame of reference 40 in FIG. 1 includes a yaw axis 45 extending vertically, a roll axis 44 extending front to back, and a pitch axis 46 extending left to right. An arrowhead 45a points up, an arrowhead 45b points down, an arrowhead 44a points forward (fore), an arrowhead 44b points back (aft), an arrowhead 46a points right (starboard), and an arrowhead 46b points left (port).

FIGS. 2-8 illustrate some of the aircraft's operating modes. In FIG. 2, the aircraft 10 is shown flying level with its nose wheel 36 in the stowed position and the main landing wheel 32 in the retracted position. FIG. 2 also shows the water scoop 20 retracted to minimize wind resistance.

FIG. 3 shows the aircraft 10 on the ground 48 with the nose wheel 36 in the landing position and the main wheel 32 in the deployed position. FIG. 3 also shows the water scoop 20 in a retracted position.

FIG. 4 shows the aircraft 10 with its water scoop 20 in an extended position, protruding down below the float 14. The aircraft 10 is flying forward and slowly descending to scoop water up from a body of water 50. In some examples, a hose 52 connects the water scoop 20 in fluid communication with a water storage tank 54 carried by the aircraft 10. When the aircraft 10 descends to submerge the water scoop 20 just below the surface of the water 50, the aircraft's forward velocity forces water 50 into the water scoop 20, up the hose 52, and into the tank 54. Later, a dump valve 56 on the aircraft 10 can be opened to release the water 50 from the tank 54 to disperse the water 50 onto a wild fire or some other target location.

Figure 5:
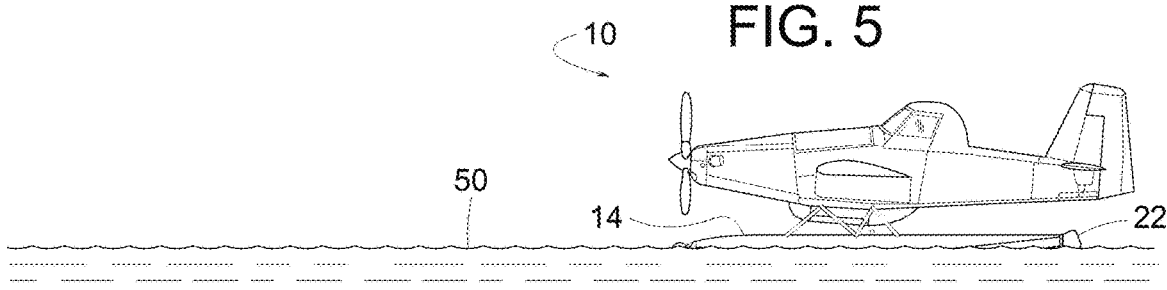
FIG. 5 is a side view of the aircraft on water.

FIGS. 5-8 show an example sequence of takeoff from the body of water 50. In FIG. 5, the aircraft 10 is floating on the body of water 50. The aircraft 10 can be stationary or traveling. When traveling, a rear rudder 22 lowered into the water 50 can be used for steering.

Figure 6:
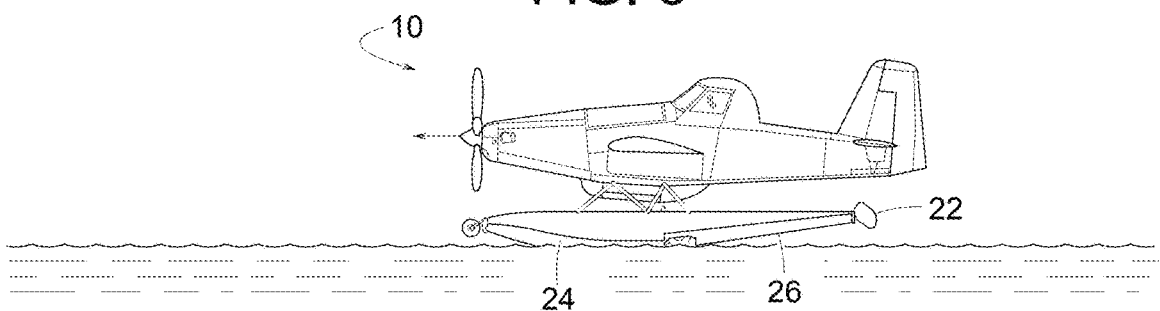
FIG. 6 is a side view similar to FIG. 5 but showing the aircraft hydroplaning on water.
Figure 7:
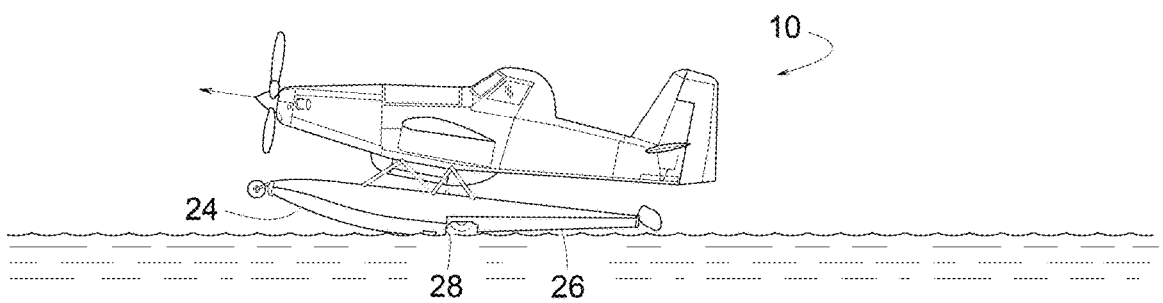
FIG. 7 is a side view similar to FIG. 6 but showing the aircraft tipped back in preparation for liftoff.

In FIG. 6, the rear rudder 22 has been raised, and the aircraft 10 has reached sufficient speed to hydroplane on the front hull 24. This lifts the rear hull 26 out of the water 50 to minimize drag and to allow the aircraft 10 to tip back for takeoff, as shown in FIG. 7.

Figure 8:
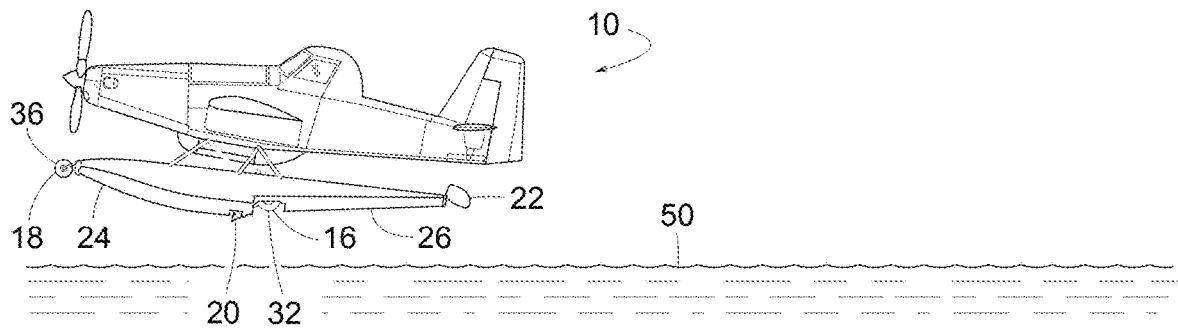
FIG. 8 is a side view showing the aircraft having lifted off.

In FIG. 8, the aircraft 10 has lifted off the surface of the water 50. The rudder 22 is raised, the nose wheel 36 is in the stowed position, and the main wheel 32 is in the retracted position. The aircraft 10 then rises to reach a desired elevation for flying level.

FIGS. 9-13 show side and bottom views of the aircraft's float assembly 12 in various configurations. FIGS. 9-11 show the float assembly 12 with the nose wheel 36 in the landing position, the main wheel 32 in the deployed position, the scoop 20 raised, and the rudder 22 tilted up. FIG. 11 further shows the nose wheel 36 having been turned left about a swivel axis 58 of the nose linkage 38. FIGS. 12 and 13 show the float assembly 12 with the nose wheel 36 in the stowed position, the main wheel 32 in the retracted position, the scoop 20 lowered, and the rudder 22 tilted up. FIG. 12 also shows a load-bearing portion 60 of the main linkage 34 protruding above the deck 30. The term, "load-bearing portion" refers to a part of the main linkage 34 that at least sometimes transmits an appreciable amount of the aircraft's weight to the main wheel 32 (e.g., when the aircraft 10 is resting on the ground 48). The term, "appreciable amount," means at least five percent of the aircraft's weight.

In some examples, the float's front hull 24 extends a first distance 62 lengthwise between a bow 64 and a trailing edge 66 of the front hull 24. The front hull 24, in some examples, has a scoop opening 68 for the water scoop 20. In some examples, the front hull 24 has a clearance notch 70 for the main linkage 34 when the main wheel 32 is in the deployed position. In some examples, a front keel 72 extends a second distance 76 lengthwise from the bow 64 to a rear end 74 of the front keel 72, wherein the rear end 74 is at the clearance notch 70. In some examples, the second distance 76 is less than the first distance 62, so the main wheel 32 can be favorably close to the step 28, which is between the front and rear hulls 24 and 26.

The term, "keel," refers to the bottom edge of a side cross-section of a hull, wherein the hull extends lengthwise (parallel to the roll axis 44) and extends widthwise (parallel to the pitch axis 46) between right and left sides of the hull; and further wherein the side cross-section is parallel to an imaginary plane lying perpendicular to the pitch axis 46, and the side cross-section is halfway between the right and left sides of the float (e.g., float 14). An example partial view of such a side cross-section is shown in FIG. 23, which shows the front keel 72 at the bottom edge of the side cross-section of the float 14.

Figure 18:
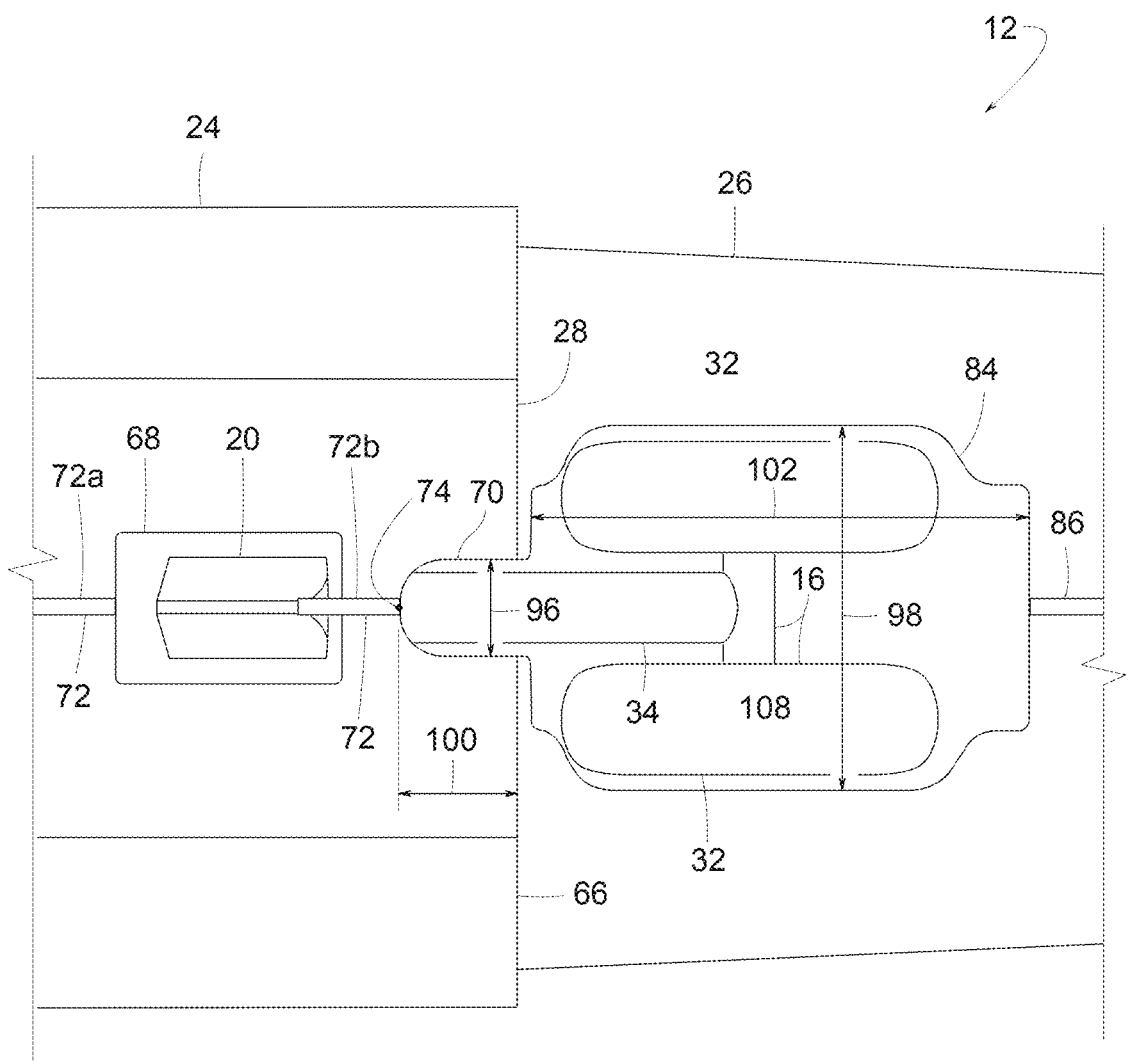
FIG. 18 is a view taken along line 18-18 of FIG. 9.

In some examples, the front keel 72 runs continuously from the bow 64 to the rear end 74. In some examples, as shown in FIG. 18, the front keel 72 comprises multiple keel segments 72a and 72b. In some examples, the keel segments 72a and 72b are spaced apart to accommodate the scoop opening 68. In some examples, the clearance notch 70 extends into the scoop opening 68, whereby the clearance notch 70 and the scoop opening 68 are a single longer notch for both the water scoop 20 and the main linkage 34.

In some examples, the float's rear hull 26 extends a third distance 78 lengthwise between a stern 80 and a leading edge 82 of the rear hull 26. The rear hull 26, in some examples, has a wheel opening 84 into which the main wheel 32 extends when the main wheel 32 is in the retracted position. Some examples of the rear hull 26 include a rear keel 86 extending a fourth distance 88 from the stern 80 to a front end 90 of the rear keel 86. In some examples, the fourth distance 88 is less than the third distance 78 to provide for the wheel opening 84.

In some examples, to allow the aircraft 10 to tip back for takeoff (e.g., FIG. 7), the step 28 has a height 92 of at least 8.5 cm (FIG. 9). So, in some examples, the rear hull's leading edge 82 is at least 8.5 cm higher than the front hull's trailing edge 66. In some examples, the aircraft 10 with two attached float assemblies 12 has an empty center of gravity 94 (FIG. 1) that is farther forward than the step 28, ensuring the float's front hull 24 can effectively carry the aircraft's weight while hydroplaning. The term, "empty center of gravity" refers to the center of mass of the combined aircraft 10 with two attached float assemblies 12 with the aircraft 10 being void of fuel, water, pilot, passengers, and cargo.

In some examples, as shown in FIG. 18, the clearance notch 70 in the front hull 24 has a width 96 that is less than a width 98 of the wheel opening 84 in the rear hull 26. This allows room for the main wheel 32 while minimizing any negative effect the clearance notch 70 might have on the front hull's ability to hydroplane. In some examples, the clearance notch 70 has a length 100 that is shorter than a length 102 of the wheel opening 84 for the same reason. It allows room for the main wheel 32 while minimizing any negative effect the clearance notch 70 might have on the front hull's ability to hydroplane. In some examples, the length 100 of the clearance notch 70 is greater than its width 96, thereby concentrating the open area of the clearance notch 70 near the front keel 72, which provides less hydroplaning forces than other areas of the front hull 24 that are more level and laterally farther away from the front keel 72, especially in examples where the nearby water scoop 20 disrupts fluid flow in front of the clearance notch 70.

Figure 14:
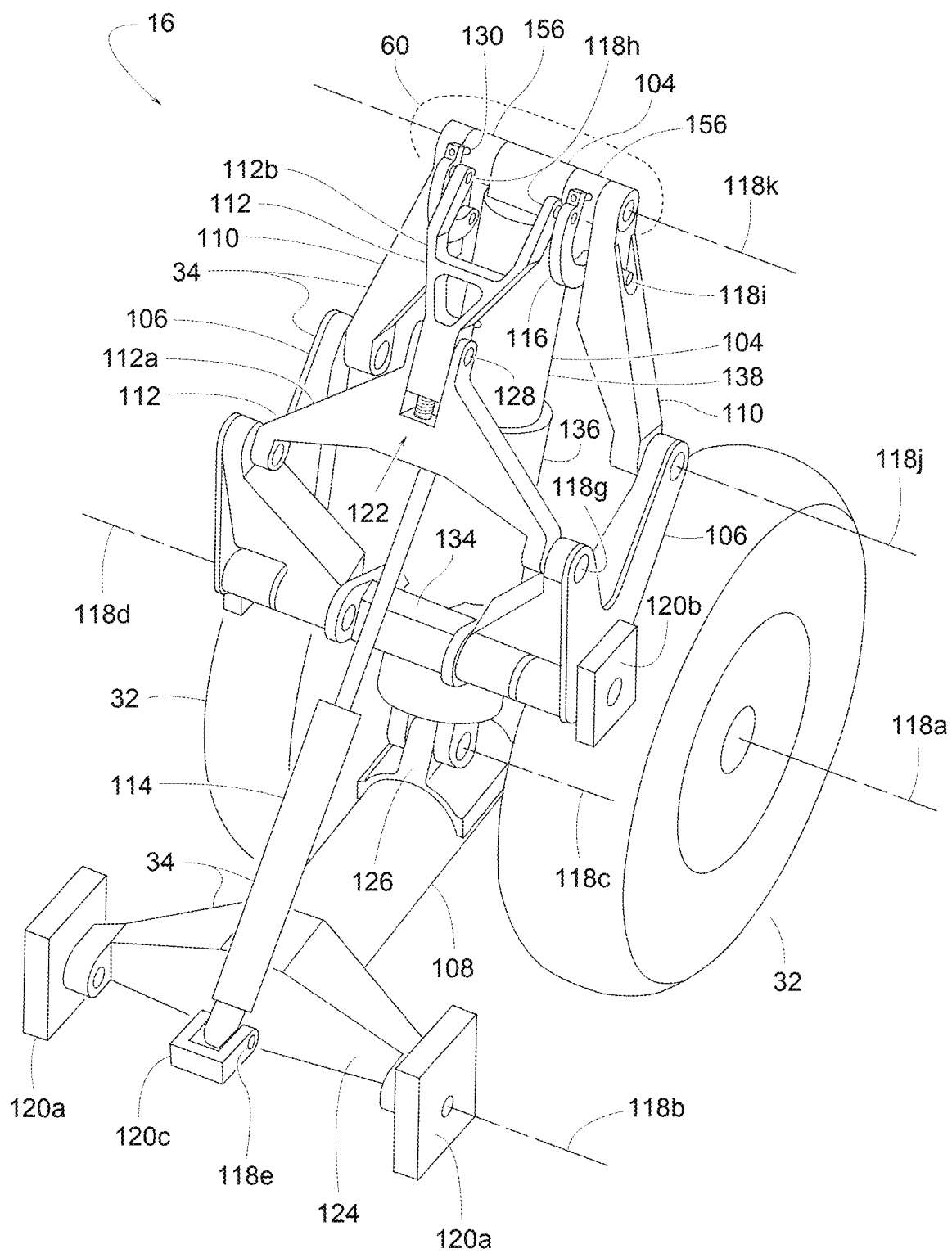
FIG. 14 is a perspective view of an example main landing gear for the amphibious aircraft shown in FIG. 1, wherein the main landing gear is shown in a retracted position.
Figure 15:
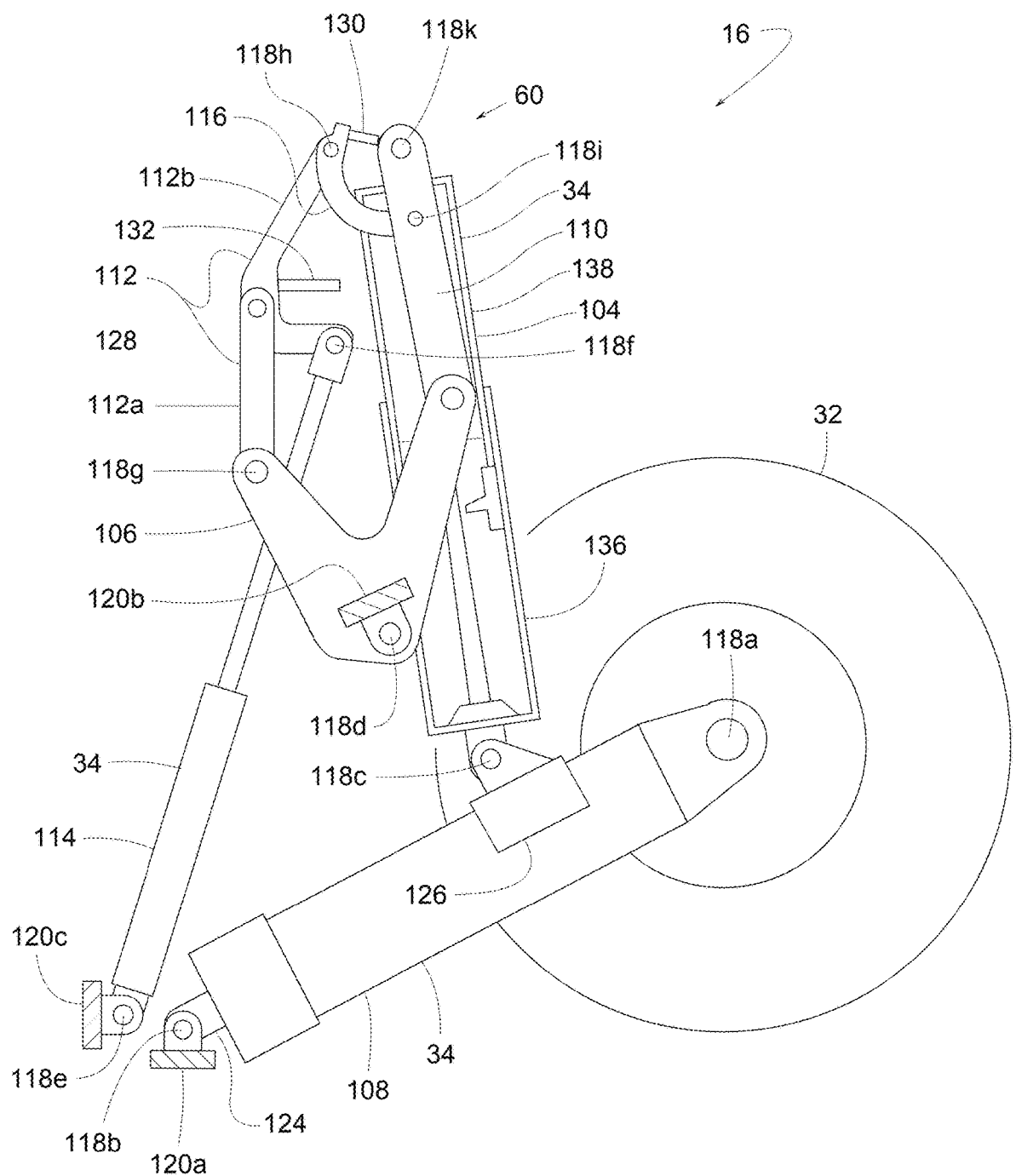
FIG. 15 is a side view of the main landing gear shown in FIG. 14, wherein some of the parts are shown schematically and/or cross-sectioned for clarity.
Figure 16:
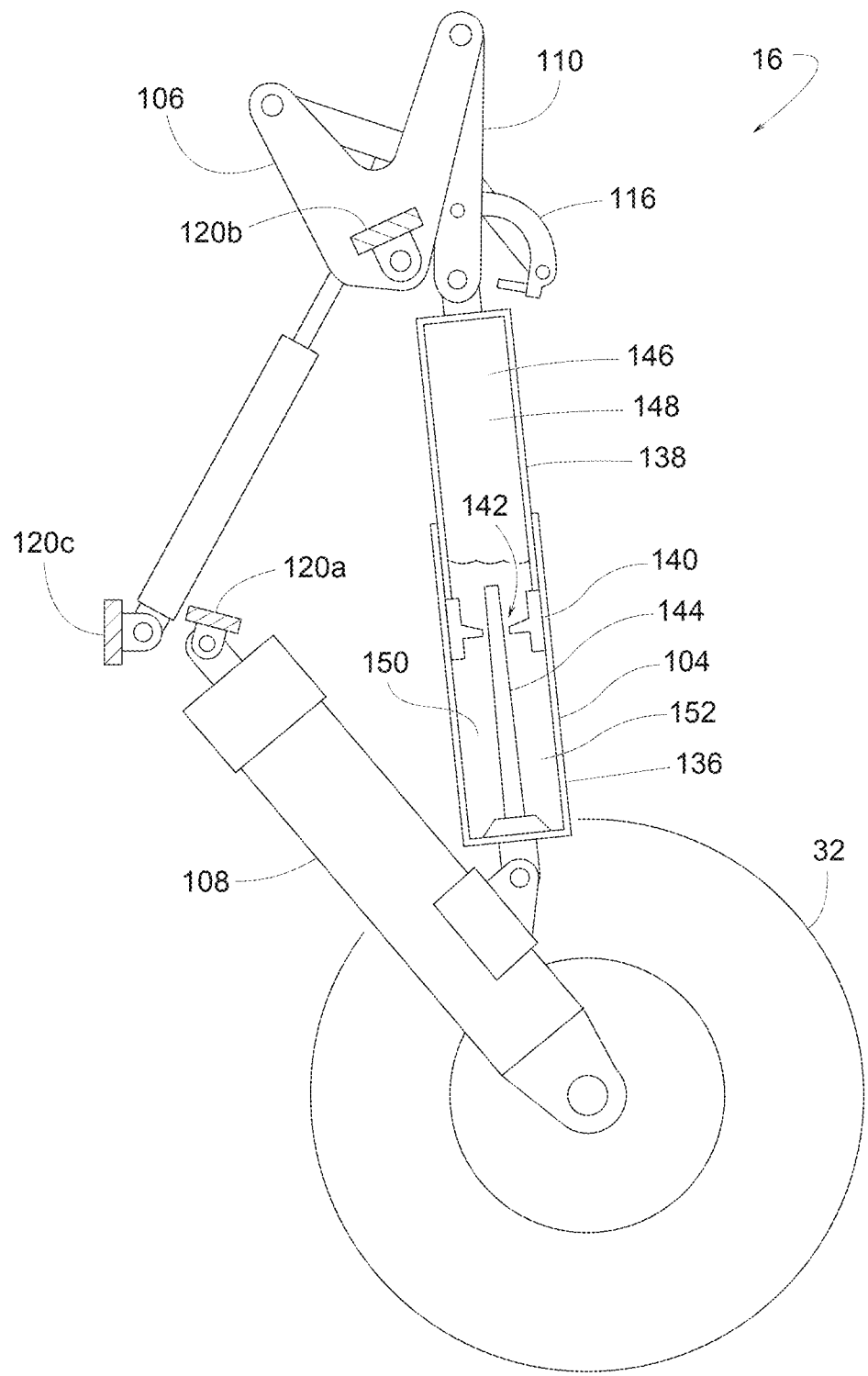
FIG. 16 is a side view similar to FIG. 15 but showing the main landing gear in a deployed position.
Figure 17:
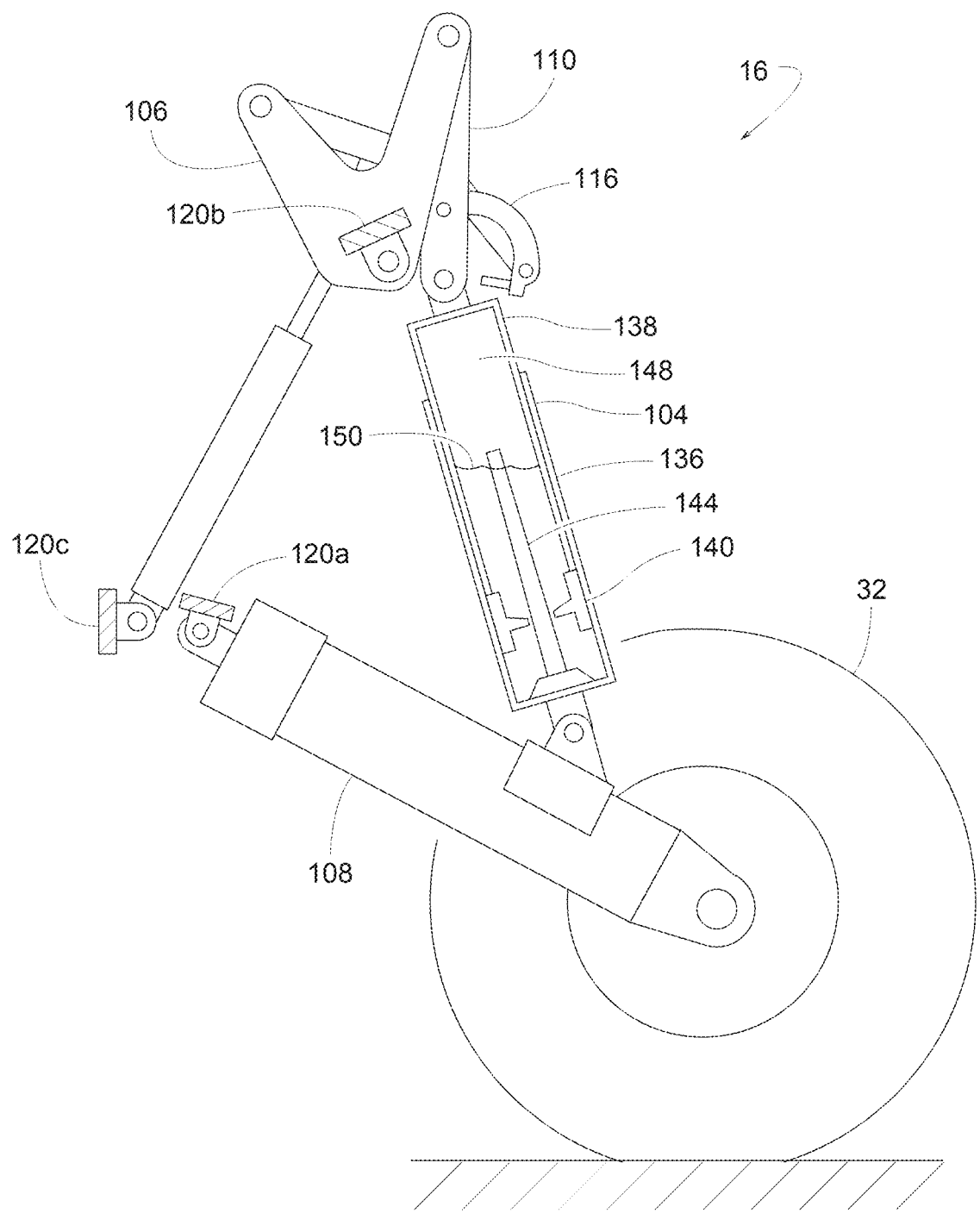
FIG. 17 is a side view similar to FIG. 16 but showing the main landing gear's bifluidic strut compressed under load.

FIGS. 14-18 show various views of the main landing gear 16, including the main wheel 32 and the main linkage 34. FIG. 14 is a perspective view showing the main landing gear 16 with the main wheel 32 in the retracted position, while a bifluidic strut 104 (e.g., an oleo) of the main linkage 34 is in an extended state. FIG. 15 shows a side view of the main landing gear 16 in the same retracted configuration; however, some parts are schematically illustrated and/or shown in cross-section for clarity. FIG. 16 shows a side view similar to FIG. 15 but with the main wheel 32 in the deployed position with the bifluidic strut 104 still in the extended state. FIG. 17 is similar to FIG. 16 but with the bifluidic strut 104 in a compressed state due to the weight or load applied to the main wheel 32.

The main linkage 34 comprises numerous links, pivotal axes, and other components. The term, "axis" is used interchangeably to represent both a line at a center of rotation and a corresponding physical part (e.g., a pin, a rod, an axle a screw, etc.) that lies along the center of rotation. In some examples, the main linkage 34 includes a base link 106, a wheel support arm 108, a swing link 110, an extension link 112, an actuator 114, a coupler 116, and the bifluidic strut 104; all of which are pivotally interconnected by a number of axes 118*a-k*. Multiple fixed mounting points or anchors 120*a-c* (schematically illustrated) connect the main linkage 34 to the float 14.

In some examples, the extension link 112 comprises a first clevis 112*a*, a second clevis 112*b*, and a resilient expansion joint 122 connecting the two clevises 112*a* and 112*b*. In some examples, the resilient expansion joint 122 comprises a spring and sliding key mechanism to urge linear lengthening of the extension link 112.

In some examples, a first axis 118*a* pivotally connects one end of the wheel support arm 108 to the main wheel 32. A yoke 124 and a second axis 118*b* pivotally connect the other end of the wheel support arm 108 to a first anchor 120*a*. A third axis 118*c* and a saddle 126 pivotally connect an intermediate portion of the wheel support arm 108 to a lower end of the bifluidic strut 104. A fourth axis 118*d* pivotally connects one point of the base link 106 to a second anchor 120*b*. A fifth axis 118*e* pivotally connects a lower end of the actuator 114 to a third anchor 120*c*. A sixth axis 118*f* pivotally connects an upper end of the actuator 114 to the second clevis 112*b* of the extension link 112. A pin 128 (e.g., a screw) at the expansion joint 122 fits in a slot to limit the joint's expansion. A seventh axis 118*g* pivotally connects one end of the extension link 112 to another point on the base link 106. An eighth axis 118*h* pivotally connects an opposite end of the extension link 112 to one end of the coupler 116. A ninth axis 118*i* pivotally connects an opposite end of the coupler 116 to an intermediate point on the swing link 110. A tenth axis 118*j* pivotally connects one end of the swing link 110 to yet another point on the base link 106. An eleventh axis 118*k* pivotally connects an opposite end of the swing link 110 to an upper end of the bifluidic strut 104. As mentioned earlier, the lower end of the bifluidic strut 104 connects to an intermediate point on the wheel support arm 108, at the third axis 118*c*.

In some examples, the actuator 114 is a hydraulic cylinder. In some examples, extension of the actuator 114 moves the main wheel 32 to the deployed position by moving the main linkage 34 from the configuration shown in FIGS. 14 and 15 to the configurations shown in FIGS. 16 and 17.

In some examples, retraction of the actuator 114 moves the main wheel 32 to the retracted position by moving the main linkage 34 from the configurations shown in FIGS. 16 and 17 to the configuration shown in FIGS. 14 and 15.

In some examples, a retracted end stop 130 (e.g., an adjustable screw) on the coupler 116 engages the load-bearing portion 60 of the main linkage 34 near the eleventh axis 118*k* to limit how far the main linkage 34 can lift the main wheel 32 (disregarding extension or compression of the bifluidic strut 104). In some examples, a deployed end stop 132 (e.g., an adjustable screw) on the second clevis 112*b* of the extension link 112 engages a spacer block 134 to limit how far the main linkage 34 can lower the main wheel 32 (disregarding extension or compression of the bifluidic strut 104). In some examples, the spacer block 134 fits laterally between two base links 106.

In some examples, the third axis 118*c*, the tenth axis 118*j*, and the eleventh axis 118*k* provide a toggle over-center mechanism that helps lock the main wheel 32 at its deployed position. In addition or alternatively, in some examples, the seventh axis 118*g*, the eighth axis 118*h*, and the ninth axis 118*i* provide a toggle over-center mechanism that helps lock the main wheel 32 at its deployed position. In some examples, the resilient expansion joint 122 facilitates the release of one more toggle over-center mechanisms. In addition or alternatively, in some examples, the resilient expansion joint 122 reduces play and backlash due to possible loose fitting links.

In some examples, the bifluidic strut 104 comprises an outer cylinder 136, a plunger 138, a flow restrictor 140 with an aperture 142 (e.g. an orifice), and a tapered metering pin 144 extending loosely through the aperture 142. Some examples of the bifluidic strut 104 do not include the tapered metering pin 144. In some examples, the plunger 138 at least partially defines a gas chamber 146 containing a gas 148 (e.g., air, nitrogen, etc.). In some examples, the outer cylinder 136 at least partially defines a liquid chamber 152 containing a liquid 150 (e.g., hydraulic oil).

As weight or load on the main wheel 32 forces the bifluidic strut 104 from its extended state (e.g., FIG. 16) to its compressed state (e.g., FIG. 17), the plunger 138 moves deeper into the outer cylinder 136. This forces the liquid 150 through an annular gap between the OD of the tapered metering pin 144 and the ID of the orifice 142. The flow restriction of the aperture 140 varies based on how far the tapered metering pin 144 extends into the aperture 142. As the bifluidic strut 104 moves from its extended state to its compressed state, the gas 148 and the liquid 150 increase in pressure, the volume of the gas 148 degreases, and the volume of the liquid 150 remains substantially constant, as the liquid 150 is generally incompressible. The term, "substantially constant" means less than five percent variation.

In some examples, the load-bearing portion 60 of the main linkage 34 protrudes up through an opening 154 in the deck 30 when the main wheel 32 is in the retracted position (see FIGS. 1, 2, 4 and 12). This provides the pilot with a visual indication that the main wheel 32 is up. To highlight the visual indication, in some examples, the deck 30 is of a first color (e.g., silver, white or black) and the load-bearing portion 60 is of a contrasting second color (e.g., red or orange). In some examples, one or more parts of the load-bearing portion 60 are anodized aluminum, which can be readily finished in various colors. Some example parts of the load-bearing portion 60 might includes the swing link 110, the upper end of the bifluidic strut 104, the second clevis 112b of the extension link 112, and axial spacers 156 between the upper end of the bifluidic strut 104 and the two swing links 110.

Figure 21:
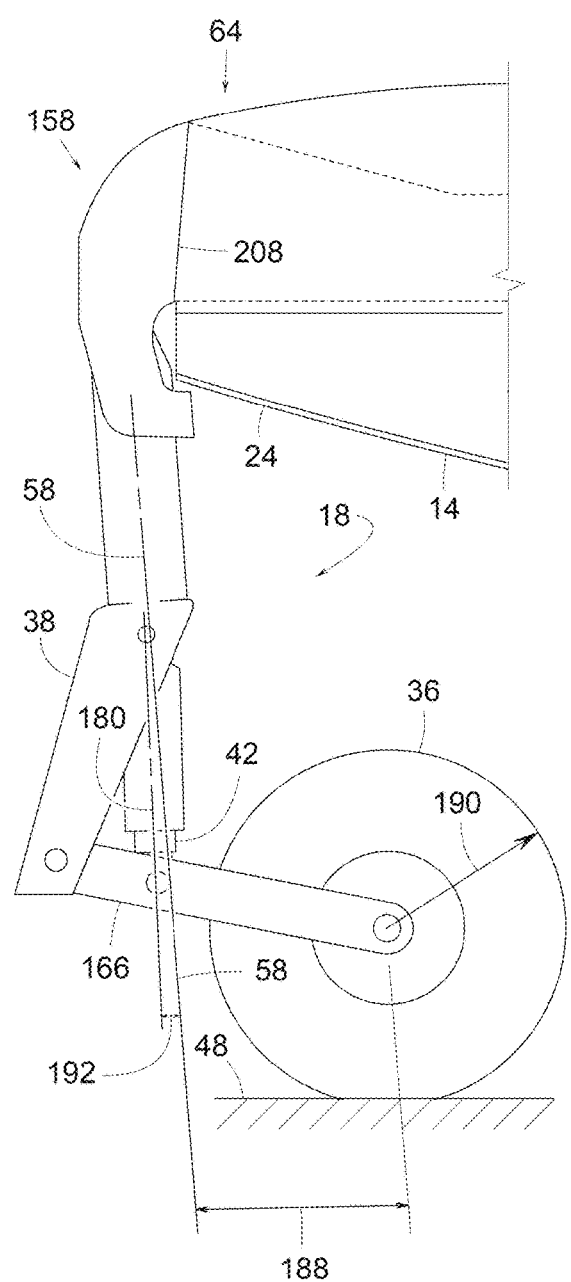
FIG. 21 is a side view similar to FIG. 19 but showing the nose gear's bifluidic strut compressed under load.
Figure 22:
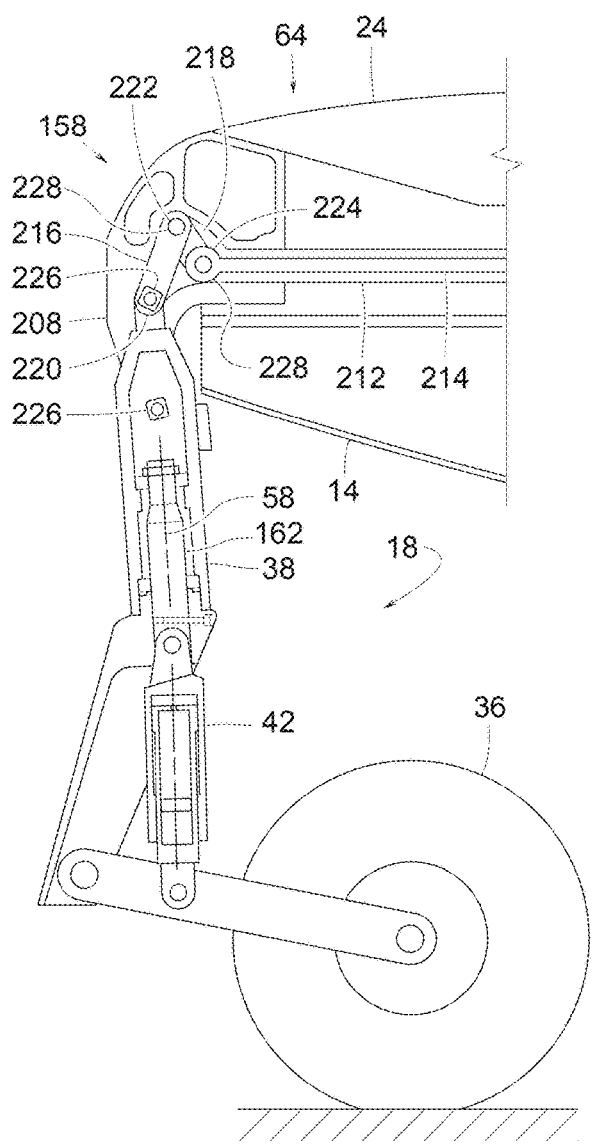
FIG. 22 is a cross-sectional view of FIG. 21, wherein some of the parts are shown schematically for clarity.
Figure 23:
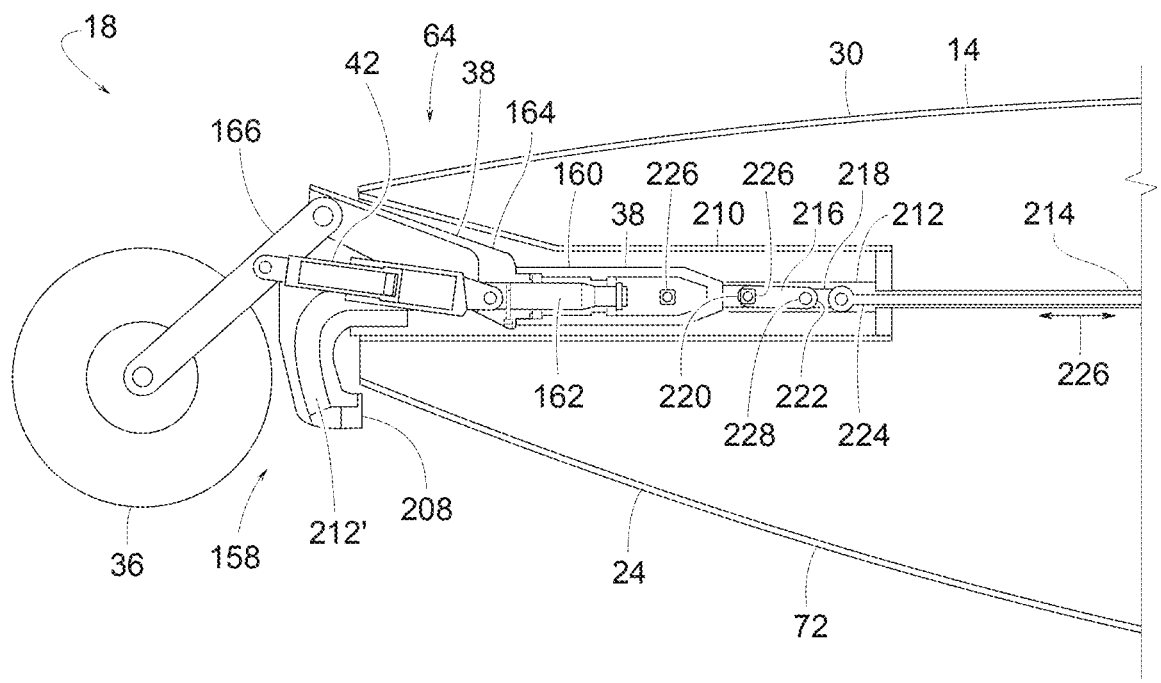
FIG. 23 is a cross-sectional side view of the nose gear in a stowed position.

FIGS. 19-22 and 25 show different views of the nose gear 18, which includes the nose linkage 38 and the nose wheel 36. FIGS. 19 and 20 show the nose wheel 36 in a landing position with the bifluidic strut 42 of the nose linkage 38 in an extended state. FIGS. 21 and 22 are similar to FIGS. 21 and 22 but with the bifluidic strut 42 shown in a compressed state in response a load or weight being applied to the nose wheel 36. FIG. 25 shows the nose wheel 36 and the nose linkage 38 in a stowed position.

In some examples, the nose linkage 38 comprises a front mounting structure 158, a sleeve 160, a shaft 162, a knee member 164, a wheel support arm 166, and the bifluidic strut 42. The front mounting structure 158 is attached to the bow 64 of the float 14. The sleeve 160 engages and is supported by the front mounting structure 158.

In some examples, the sleeve 160 contains an upper bearing 168 and a lower bearing 170. Some examples of bearings 168 and 170 include rolling element bearings, ball bearings, needle bearings, tapered needle bearings sleeve/journal bearings, etc. The upper and lower bearings 168 and 170 define the swivel axis 58. The shaft 162 extends lengthwise along the swivel axis 58 into the sleeve 160. The upper and lower bearings 168 and 170 allow the shaft 162 to rotate about the swivel axis 58. In some examples, a nut 172 secures the shaft 162 axially within the sleeve 160.

In some examples, the knee member 164 is solidly affixed to the shaft 162. In some examples, a fastener 174 ensures a solid connection between the shaft 162 and the knee member 164. In addition or alternatively, other means for ensuring a solid connection include using a press fit (tapered or straight), spline, key, welding, and making the shaft 162 and knee member 164 as a monolithic piece. With a secure connection, both the shaft 162 and the knee member 164 rotate as a unit about the swivel axis 58 relative to the sleeve 160.

In some examples, the shaft 162 is made of titanium (i.e., pure titanium or titanium alloy), and the knee member 164 is made of aluminum (i.e., pure aluminum or aluminum alloy). The joint where the shaft 162 connects to the knee member 164 can be subject to high stress. In some examples where the outer diameter of the shaft 162 is small compared to the size of the knee member 164, relatively strong titanium is used for the shaft 162, while relatively inexpensive aluminum is used for the knee member 164.

In some examples, a first axis 176 pivotally connects a proximal end 42a of the bifluidic strut 42 to the shaft 162. In some examples, the first axis 176 intersects and is perpendicular to the swivel axis 58. In some examples, a second axis 178 pivotally connects a distal end 42b of the bifluidic strut 42 to an intermediate point 166c of the wheel support arm 166. In some examples, the bifluidic strut 42 defines a strut longitudinal centerline 180 intersecting the first and second axes 176 and 178.

In some examples, a third axis 182 pivotally connects a first end 166a of the wheel support arm 166 to the knee member 164. A second end 166b of the wheel support arm 166 supports the nose wheel 36 with a wheel axle 184 such that the nose wheel 36 is rotatable about a wheel axis 186 defined by the wheel axle 184.

In some examples, the shaft 162 being rotatable about the swivel axis 58 allows the nose wheel 36 to also swivel or turn about the swivel axis 58. In some examples, when the nose wheel 36 turns about the swivel axis 58, other components turn about the swivel axis 58 as well. Examples of such components include the wheel support arm 166, the knee member 164, and the bifluidic strut 42. In some examples, the nose wheel 36 is free to turn naturally on its own, independent of any manually controlled steering mechanism.

To urge the nose wheel 36 to naturally point in the right direction, the wheel axis 186 is strategically positioned at a trailing offset distance 188 from the swivel axis 58. To prevent the nose wheel 36 from shimming when traveling on land, in some examples, the trailing offset distance 188 is greater than 0.25 times an outermost radius 190 of the nose wheel 36 when the bifluidic strut 42 is in an extended state (FIGS. 19 and 20). In addition or alternatively, to prevent the nose wheel 36 from shimming on land, in some examples, the trailing offset distance 188 is greater than the outermost radius 190 when the bifluidic strut 42 is in the compressed state (FIGS. 21 and 22). In some examples, the trailing offset distance 188 is greater when the bifluidic strut 42 is in the compressed state than when the bifluidic strut 42 is in the extended state to avoid shimmying regardless of whether the bifluidic strut 42 is compressed or extended.

The relative positions of the various axes 176, 178, 182, 186 and the bifluidic strut's longitudinal centerline 180 and how those positions might change as the bifluidic strut 42 moves between its extended and compressed states can determine how smoothly the nose gear 18 operates. To this end, in some examples, the third axis 182 and the first axis 176 are in fixed spaced-apart relationship with each other. The third axis 182 and the second axis 178 are in fixed spaced-apart relationship with each other. The first axis 176 and the second axis 178 are in variable spaced-apart relationship with each other. The strut longitudinal centerline 180 is at a first angle 192 to the swivel axis 58 when the bifluidic strut 42 is in the compressed state, and the strut longitudinal centerline 180 is at a second angle 194 to the swivel axis 58 when the bifluidic strut 42 is in the relaxed state, wherein the first angle 192 is different than the second angle 194. The bifluidic strut 42 pivots about the first axis 176 relative to the shaft 162 when the bifluidic strut 42 moves between the compressed state and the extended state. The bifluidic strut 42 pivots relative to the wheel support arm 166 about the second axis 178 at the intermediate point 166c of the wheel support arm 166 when the bifluidic strut 42 moves between the compressed state and the extended state. The second axis 178 is substantially parallel to the wheel axis 186, substantially parallel to the first axis 176, and substantially perpendicular to the swivel axis 58. In some examples, the bifluidic strut 42 is pivotal about the first axis 176, which is substantially perpendicular to the swivel axis 58 and substantially parallel to the wheel axis 186. In some examples, the swivel axis 58 is tilted front-to-back at least two degrees from perpendicular to a horizontal plane (the horizontal plane is perpendicular to the vertical yaw axis 45) when the nose wheel 36 is in the landing position and the aircraft 10 is flying level. In other words, the swivel axis 58 is tilted forward or back at least two degrees. In some examples, any one, or more, or all of the aforementioned relative positions and movements can ensure smooth operation of the nose gear 18.

The term, "substantially parallel," as it relates to two lines or axes means that the two lines or axes are within five degrees of being perfectly parallel to each other. The term, "substantially perpendicular," as it relates to two lines or axes means that the two lines or axes are within five degrees of being perfectly perpendicular to each other.

The bifluidic strut 42 of the nose linkage 38 provides fluid-dampened suspension, so the nose wheel 36 in the landing position moves smoothly in response to the weight or load applied to the nose wheel 36. Referring to FIGS. 23 and 24, some examples of the nose linkage's bifluidic strut 42 comprise an outer cylinder 196, a plunger 198, a liquid chamber 200 containing the liquid 150, a gas chamber 202 containing the gas 148, and an aperture 204. The term, "aperture," as it relates to fluid flow refers to any single or multiple openings for providing flow restriction. Some examples of an aperture include an orifice, an opening, a slit, a gap, a tube, a porous material, etc In some examples, the liquid chamber 200 is at least partially contained between the outer cylinder 196 and the plunger 198. In some examples, the gas chamber 202 is at least partially contained inside the plunger 198. In some examples, the bifluidic strut 42 is inverted (as shown) with the liquid chamber 200 being above the gas chamber 202 when the nose gear 18 is in the landing position. In such inverted examples, the nose wheel 36 is closer to the gas chamber 202 than to the liquid chamber 200.

Some examples of the bifluidic strut 42 also include a free-floating piston 206. The term, "free-floating" means that the piston can move independently without being forced to move by an otherwise attached rod, shaft or cable. In some examples, the free-floating piston 206 moves in response to a fluid pressure differential applied to opposite faces of the free-floating piston 206. In some examples, the free-floating piston 206 is inside the plunger 198 and serves as a seal separating the liquid 150 from the gas 148. The free-floating piston 204 helps keep the liquid 150 from mixing with the gas 148, so the bifluidic strut 42 works well in any orientation, including upright, horizontal and inverted.

Upright is when the gas chamber 202 is above the liquid chamber 200. Bifluidic strut 104 in FIGS. 15-17 is an example of an upright bifluidic strut. Horizontal is when the nose gear 18 is in the stowed position, as shown in FIG. 23. Inverted is when the liquid chamber 200 is above the gas chamber 202, as shown in (FIGS. 19-22, 24 and 25). In some examples, the bifluidic strut 42 is inverted to fit and tilt within the limited space in the area where the bifluidic strut 42 connects to the nose wheel support arm 166.

As weight or load on the nose wheel 36 forces the bifluidic strut 42 from its extended state (e.g., FIGS. 19, 20 and 24) to its compressed state (e.g., FIGS. 21, 22 and 25), the plunger 198 moves deeper into the outer cylinder 196. This forces the liquid 150 down through the orifice 204 and pushes the free-floating piston 206 down. As the bifluidic strut 42 moves from its extended state to its compressed state, the gas 148 and the liquid 150 increase in pressure, the volume of the gas 148 degreases, and the volume of the liquid 150 remains substantially constant, as the liquid 150 is generally incompressible.

To lift the nose wheel 36 from the landing position (FIGS. 3, 9-11 and 19-22) to the stowed position (FIGS. 1, 2, 4-8, 12 and 23), the nose gear 18 uses the front mounting structure 150. In some examples, the front mounting structure 158 comprises a nose bracket 208 attached to the bow 64 of the float 14, a container 210 extending from the bracket 208 and into the float 14, a track 212 supported by the container 210, a bar 214 extending through the float 14 and into the container 210, a first link 216, and a second link 218.

In some examples, the first link 216 has one end 220 pivotally connected to the sleeve 38 and an opposite end 222 pivotally connected to one end of the second link 218. The other end of the second link 218 is pivotally connected to a forward end 224 of the bar 214. A back end 215 of the bar 214 is connected to some means for pushing or pulling the bar 214, as indicated by arrow 225 in FIG. 23. Some examples of such means for pushing or pulling the bar 214 include an electric actuator, an hydraulic cylinder, a gas cylinder, manual force, a cable, a cord, a strap, a chain, a linkage assembly, a rack-and-pinion mechanism, a leadscrew, a spring, and various combinations thereof etc.

In some examples, pulling the bar 214 back along the track 212 pulls the nose linkage 38 and nose wheel 36 from the landing position to the stowed position. Track followers 226 and 228 slide or roll along the track 212 to guide the nose linkage 38 into the container 210, as shown in FIG. 23. In some examples, a portion 212' of the track 212 is curved to turn the nose linkage 38 from a generally vertical orientation to a generally horizontal one upon moving the nose wheel 36 from the landing position to the stowed position.

In the stowed position, in some examples, the bifluidic strut 42 extends into the container 210 while the nose wheel 36 is outside the container 210. With such an arrangement, the container 210 does not have to be as large and heavy as it would need to be if the container 210 were sized to contain the entire nose linkage 38 and nose wheel 36.

In some examples, the bifluidic strut's proximal end 42a is higher than the distal end 42b when the nose wheel 36 is in the landing position, as shown in FIGS. 19-22. In some examples, the bifluidic strut's proximal end 42a is lower than the distal end 42b when the nose wheel 36 is in the stowed position, as shown in FIG. 23. This makes the nose linkage 38 more streamlined in the stowed position.

Figure 26:
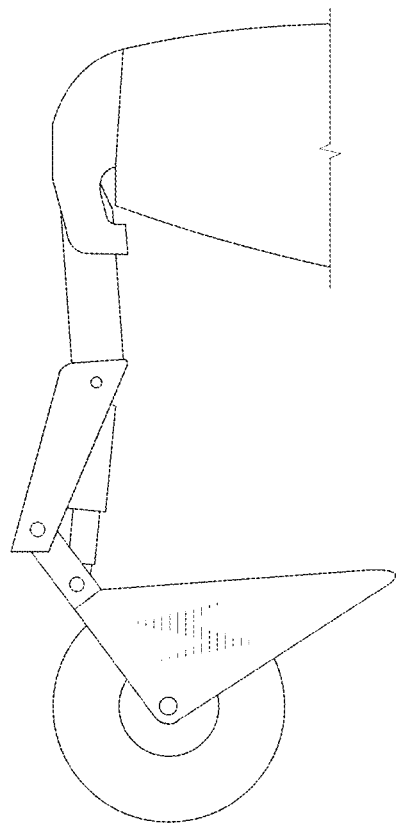
FIG. 26 is a side view similar to FIG. 19 but with the addition of an optional tail fin.
Figure 27:
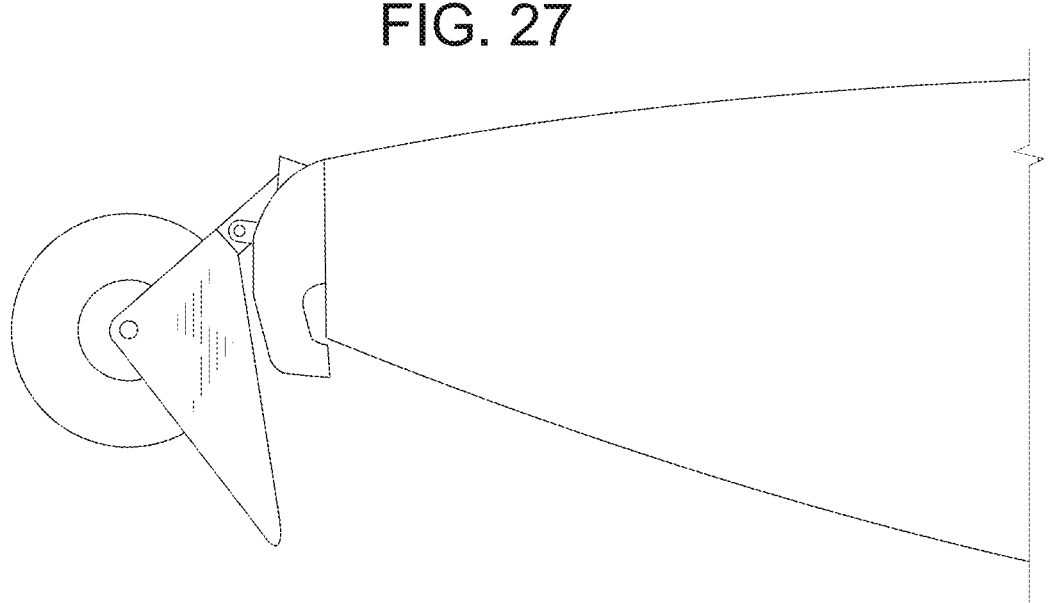
FIG. 27 is a side view similar to FIG. 26 but with the nose gear in a stowed position.

In some examples, as shown in FIGS. 26 and 27, a tail fin 230 is attached to the nose gear 18 to help point the nose wheel 36 straight ahead, in the direction of flight. In some examples, the nose gear 18 includes two tail fins 230 with the nose wheel 36 between the two tail fins 230.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A float assembly mountable to an aircraft, the float assembly comprising:
   a front hull extending lengthwise between a bow of the front hull and a trailing edge of the front hull, the front hull defining a clearance notch extending from the trailing edge of the front hull toward the bow;
   a rear hull extending lengthwise between a stern of the rear hull and a leading edge of the rear hull, the rear hull defining a wheel opening extending from the leading edge of the rear hull toward the stern;
   a step between the trailing edge of the front hull and the leading edge of the rear hull such that the leading edge of the rear hull is higher than the trailing edge of the front hull when the aircraft is flying level with the float assembly mounted to the aircraft;
   a nose wheel coupled to the front hull and being closer to the bow than to the trailing edge of the front hull;
   a main wheel; and a main linkage supporting the main wheel, the main linkage being movable to move the main wheel between a retracted position and a deployed position relative to the rear hull, the main linkage extending into the clearance notch when the main wheel is in the deployed position, and the main wheel extending into the wheel opening when the main wheel is in the retracted position.

2. The float assembly of claim 1, wherein the wheel opening in the rear hull is wider than the clearance notch in the front hull.

3. The float assembly of claim 1, wherein the wheel opening in the rear hull is longer than the clearance notch in the front hull.

4. The float of claim 1, further comprising a deck overlying the rear hull, and a load-bearing portion of the main linkage protrudes above the deck when the main wheel is in the retracted position.

5. The float of claim 4, wherein the deck is of a first color, and the load-bearing portion of the main linkage is of a second color distinguishable from the first color.

6. The float of claim 5, wherein the load-bearing portion of the main linkage includes anodized aluminum to create the second color.

7. The float of claim 1, wherein the clearance notch has a length that is greater than a width of the clearance notch.

8. A float assembly mountable to an aircraft, the float assembly comprising:
a float;
a nose wheel coupled to the float;
a main wheel;
a main linkage coupling the main wheel to the float, the main linkage being movable to move the main wheel between a retracted position and a deployed position relative to the float;
a deck on top of the float;
a front hull attached to the float under the deck, the front hull comprising a front keel, a bow, and a trailing edge; the bow being closer to the front wheel than to the main wheel, the front hull extending a first distance lengthwise between the bow and the trailing edge, the front keel extending a second distance from the bow to a rear end of the front keel, the second distance being less than the first distance, the front hull defining a clearance notch extending from the trailing edge of the front hull to the rear end of the front keel, the main linkage extending into the clearance notch when the main wheel is in the deployed position;
a rear hull attached to the float under the deck, the rear hull comprising a rear keel, a stern, and a leading edge; the stern being closer to the main wheel than to the front wheel, the rear hull extending a third distance lengthwise between the stern and the leading edge, the rear keel extending a fourth distance from the stern to a front end of the rear keel, the fourth distance being less than the third distance, the rear hull defining a wheel opening into which the main wheel extends when the main wheel is in the retracted position; and
a step between the trailing edge of the front hull and the leading edge of the rear hull such that the leading edge of the rear hull is higher than the trailing edge of the front hull when the aircraft is flying level with the float assembly mounted to the aircraft.

9. The float assembly of claim 8, wherein the wheel opening in the rear hull is wider than the clearance notch in the front hull.

10. The float assembly of claim 8, wherein the wheel opening in the rear hull is longer than the clearance notch in the front hull, and the clearance notch has a length that is greater than a width of the clearance notch.

11. The float assembly of claim 8, further comprising a deck overlying at least one of the rear hull and the front hull, and a load-bearing portion of the main linkage protrudes above the deck when the main wheel is in the retracted position.

12. The float assembly of claim 11, wherein the deck is of a first color, and the load-bearing portion of the main linkage is of a second color distinguishable from the first color.

13. The float assembly of claim 5, wherein the load-bearing portion of the main linkage includes anodized aluminum to create the second color.

14. An amphibious aircraft comprising:
an airplane;
a float attached to the airplane;
a water storage tank supported by at least one of the airplane and the float;
wherein the float comprises;
a front hull of the float extending lengthwise between a bow of the front hull and a trailing edge of the front hull, the front hull defining a clearance notch extending lengthwise from the trailing edge of the front hull toward the bow;
a rear hull of the float extending lengthwise between a stern of the rear hull and a leading edge of the rear hull, the rear hull defining a wheel opening extending from the leading edge of the rear hull toward the stern, the wheel opening in the rear hull being wider than the clearance notch in the front hull, the wheel opening in the rear hull being longer than the clearance notch in the front hull, the clearance notch being greater in length than width;
a step between the trailing edge of the front hull and the leading edge of the rear hull such that the leading edge of the rear hull is higher than the trailing edge of the front hull when the aircraft is flying level;
a water scoop protruding downward below the front hull and being in fluid communication with the water storage tank;
a nose wheel coupled to the float with the front hull being closer to the bow than to the trailing edge of the front hull;
a main wheel coupled to the float; and
a main linkage connected to the main wheel, the main linkage being movable to move the main wheel between a retracted position and a deployed position relative to the float, the main linkage extending into the clearance notch when the main wheel is in the deployed position, and the main wheel extending into the wheel opening when the main wheel is in the retracted position.

15. The amphibious aircraft of claim 14, further comprising a deck overlying the rear hull, and a load-bearing portion of the main linkage protrudes above the deck when the main wheel is in the retracted position.

16. The amphibious aircraft of claim 15, wherein the deck is of a first color, and the load-bearing portion of the main linkage is of a second color distinguishable from the first color.

17. The amphibious aircraft of claim 16, wherein the load-bearing portion of the main linkage includes anodized aluminum to create the second color.

18. The float of claim 14, wherein the clearance notch has a length that is greater than a width of the clearance notch.

\* \* \* \* \*